(12) United States Patent
Yarvis et al.

(10) Patent No.: US 7,626,967 B2
(45) Date of Patent: Dec. 1, 2009

(54) METHODS AND APPARATUS FOR PROVIDING A TRANSPARENT BRIDGE ASSOCIATED WITH A WIRELESS MESH NETWORK

(75) Inventors: Mark D. Yarvis, Portland, OR (US); W. Steven Conner, Hillsboro, OR (US); Anand Rangarajan, Hillsboro, OR (US); Harkirat Singh, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 696 days.

(21) Appl. No.: 11/030,523

(22) Filed: Jan. 5, 2005

(65) Prior Publication Data

US 2006/0146846 A1    Jul. 6, 2006

(51) Int. Cl.
*H04W 4/00* (2009.01)
(52) U.S. Cl. .................. 370/338; 370/401; 370/389
(58) Field of Classification Search ............. None
See application file for complete search history.

(56) References Cited

U.S. PATENT DOCUMENTS

| | | | |
|---|---|---|---|
| 5,566,170 | A | 10/1996 | Bakke et al. |
| 6,298,053 | B1 * | 10/2001 | Flammer et al. ............ 370/349 |
| 7,164,667 | B2 * | 1/2007 | Rayment et al. ............ 370/329 |
| 7,215,658 | B2 * | 5/2007 | Alastalo et al. ............. 370/338 |
| 7,366,191 | B2 * | 4/2008 | Higashiyama .............. 370/406 |
| 2003/0169696 | A1 | 9/2003 | Quinn et al. |
| 2004/0156345 | A1 * | 8/2004 | Steer et al. .................. 370/338 |
| 2004/0174900 | A1 * | 9/2004 | Volpi et al. ................. 370/466 |
| 2004/0208156 | A1 | 10/2004 | Chu et al. |
| 2005/0068970 | A1 * | 3/2005 | Srikrishna et al. .......... 370/400 |
| 2005/0074019 | A1 * | 4/2005 | Handforth et al. .......... 370/406 |
| 2005/0135268 | A1 * | 6/2005 | Simon et al. ................ 370/254 |
| 2005/0138359 | A1 * | 6/2005 | Simon et al. ................ 713/156 |
| 2005/0147097 | A1 * | 7/2005 | Chari et al. ................. 370/392 |
| 2005/0185606 | A1 * | 8/2005 | Rayment et al. ............ 370/328 |
| 2006/0045064 | A1 * | 3/2006 | Qin et al. .................... 370/351 |
| 2006/0109790 | A1 * | 5/2006 | Erwin et al. ................ 370/238 |
| 2006/0120370 | A1 * | 6/2006 | Ginchereau et al. ........ 370/392 |
| 2006/0126611 | A1 * | 6/2006 | Kelly et al. ................. 370/389 |
| 2006/0146712 | A1 * | 7/2006 | Conner et al. .............. 370/235 |
| 2006/0146718 | A1 * | 7/2006 | Yarvis et al. ............... 370/238 |
| 2007/0280192 | A1 * | 12/2007 | Yagyu et al. ............... 370/349 |

FOREIGN PATENT DOCUMENTS

EP          1 341 349 A1    9/2003

OTHER PUBLICATIONS

Baker, et al. "The Architectural Organization of a Mobile Radio Network via a Distributed Algorithm", IEEE Trans. on Comm's, vol. Com-29, No. 11, Nov. 1981, pp. 1694-1701.
Yarvis, et al. "Real-World Experiences with an Interactive Ad Hoc Sensor Network", 2002 IEEE, Proc. of the Int'l. Conf. on Parallel Processing Workshops, whole document.

(Continued)

*Primary Examiner*—Bob A Phunkulh
(74) *Attorney, Agent, or Firm*—Schwabe, Williamson & Wyatt, P.C.

(57) ABSTRACT

Embodiments of methods and apparatus for providing a transparent data-link bridge associated with a wireless mesh network are generally described herein. Other embodiments may be described and claimed.

26 Claims, 10 Drawing Sheets

OTHER PUBLICATIONS

Connor, et al., "Experimental Evaluation of Synchronization and Topology Control for In-Building Sensor Network Appls", WSNA '03, Sep. 19, 2003, San Diego, CA, pp. 38-49.

De Couto, et al. "A High-Throughput Path Metric for Multi-Hop Wireless Routing", MobiCom '03, Sep. 14-19, 2003, San Diego, CA, whole document.

Clausen, et al. "Optimized Link State Routing Protocol (OLSR)", http://hipercom.inria.fr/olsr/rfc3626.txt, Oct. 2003, 71 pgs.

Draves, et al. "Routing in Multi-Radio, Multi-Hop Wireless Mesh Networks", MobiCom '04, Sep. 26-Oct. 1, 2004, Philadelphia, PA, whole document.

Connor, et al. "Methods and Apparatus for Distributing Link-State Information Associated With a Wireless Mesh Network", U.S. Appl. No. 11/025,612, filed Dec. 29, 2004.

Yarvis, et al, "Multichannel Mesh Router and Methods for Path Selection in a Multichannel Mesh Network", U.S. Appl. No. 11/030,593, filed Jan. 4, 2005.

Conner, et al, "Multichannel Mesh Network, Multichannel Mesh Router and Methods for Routing Using Bottleneck Channel . . . ", U.S. Appl. No. 11/030,592, filed Jan. 4, 2005.

Connor, et al, "Methods and Apparatus for Identifying a Distance-Vector Route Associated With a Wireless Mesh Network", U.S. Appl. No. 11/030,016, filed Jan. 5, 2005.

Tasaki et al., "A New Channel Assignment Strategy towards the Wireless Mesh Networks," Communications, 2004 and the 5th International Symposium on Multi-Dimensional Mobile Communication Proceedings. The 2004 Joint Conference on the 10th Asia-Pacific Conference on Beijing, China, Aug. 29-Sep. 1, 2004, Piscataway, NJ, USA, IEEE, US, Aug. 29, 2004, pp. 71-75.

\* cited by examiner

METHODS AND APPARATUS FOR PROVIDING A TRANSPARENT BRIDGE ASSOCIATED WITH A WIRELESS MESH NETWORK

TECHNICAL FIELD

The present disclosure relates generally to wireless communication systems, and more particularly, to methods and apparatus for providing a transparent data-link bridge associated with a wireless mesh network.

BACKGROUND

A bridge is a data-link layer (Layer 2) internetworking device that interconnects two local area networks (LANs) such as Ethernet networks. Typically, the bridge may be transparent to end-node network devices because the end-node network devices may not be aware of the bridge. For example, the bridge may operate as a transparent bridge as described in the 802.1D standard developed by the Institute of Electrical and Electronic Engineers (IEEE) (e.g., the IEEE std. 802.1D, published 1999).

In particular, the transparent bridge may read the source and destination addresses in packets (or frames) and forward the packets on to another LAN segment depending on the addresses. A bridging table may be used to keep track of one or more bridge ports through which each destination may be reached (e.g., an outbound port). For example, if the bridging table includes a destination address of a packet and if the corresponding outbound port is any bridge port other than the inbound port through which the transparent bridge received the packet, the transparent bridge may forward the packet to the destination via the outbound port. Otherwise if the bridging table does not include the destination address of the packet, the transparent bridge may forward the packet via all bridge ports except for the inbound port of the packet.

DETAILED DESCRIPTION

In general, methods and apparatus for providing a transparent bridge associated with a wireless mesh network are described herein. According to one example embodiment, a portal node may identify bridging information associated with a destination of a packet. The portal node may be one of a plurality of mesh nodes associated with a wireless mesh network. The wireless mesh network may be communicatively coupled to one or more communication networks via the portal node. In one example, the portal node may identify bridging information associated with one of the plurality of mesh nodes of the wireless mesh network. The portal node may also identify bridging information associated with a node of a communication network communicatively coupled to the wireless mesh network via the portal node. In another example, the portal node may identify bridging information indicative of a failure to access the destination through the portal node.

Accordingly, one or more of the plurality of mesh nodes (e.g., the portal node or a non-portal node) may process the packet based on the bridging information. In one example, a mesh node may forward the packet to the destination via a route through a particular portal node if the routing table of the mesh node corresponds to a bridging table of the portal node indicating that the destination may be reached through an outbound port other than the port attached to the wireless mesh network. In another example, the mesh node may forward the packet to all portal nodes of the wireless mesh network if the routing table of the mesh node fails to include a bridge-type entry associated with destination of the packet. In yet another example, the mesh node may forward the packet to a destination within the wireless mesh network if the routing table of the mesh node includes a route to the destination. The methods and apparatus described herein are not limited in this regard.

Figure 1:
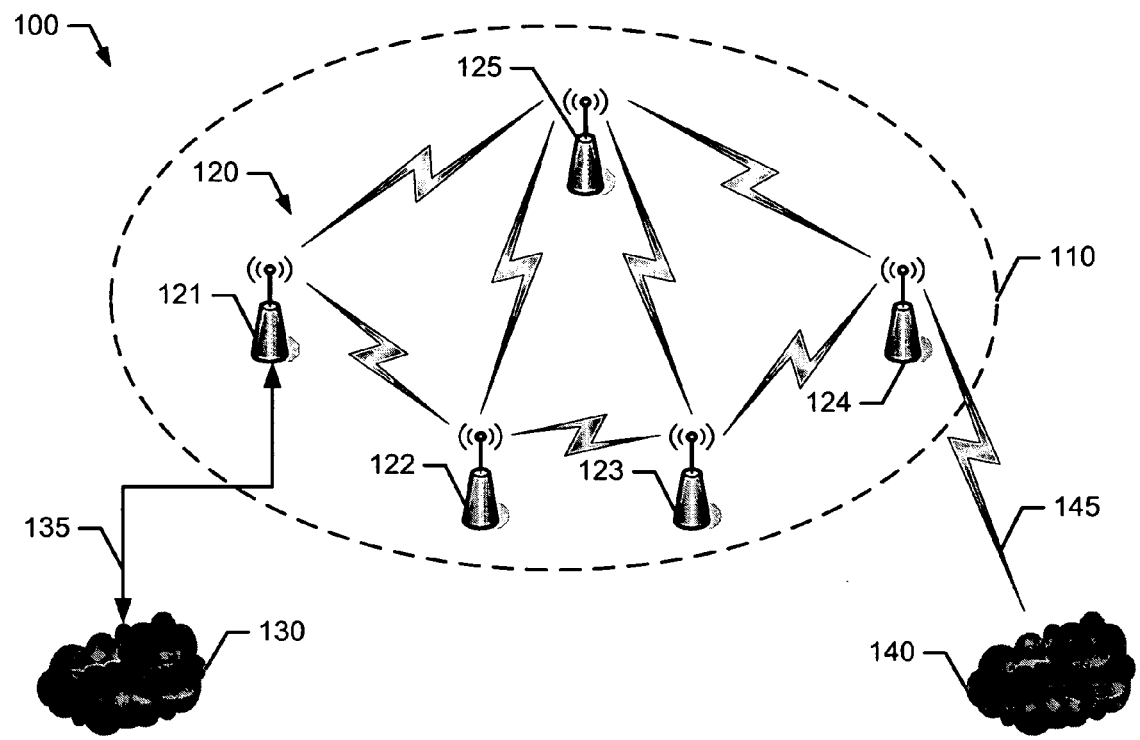
FIG. 1 is a schematic diagram representation of an example wireless communication system according to an embodiment of the methods and apparatus disclosed herein.

Referring to FIG. 1, an example wireless communication system 100 including a wireless mesh network 110 is described herein. The wireless mesh network 110 may include a plurality of mesh nodes 120, generally shown as 121, 122, 123, 124, and 125. Although FIG. 1 depicts five mesh nodes, the wireless mesh network 110 may include additional or fewer mesh nodes. As described in detail below, the plurality of mesh nodes 120 may include access points, redistribution points, end points, and/or other suitable connection points for traffic flows via mesh routes having multiple hops. Accordingly, the wireless mesh network 110 may be implemented to provide a wireless personal area network (WPAN), a wireless local area network (WLAN), a wireless metropolitan area network (WMAN), a wireless wide area network (WWAN), and/or other suitable wireless communication networks.

The wireless communication system 100 may also include other communication networks, generally shown as 130 and 140. In one example, the plurality of mesh nodes 120 may communicate with the communication network 130 (e.g., an Ethernet LAN) via a wired link 135. In another example, the plurality of mesh nodes 120 may communicate with the communication network 140 (e.g., another wireless mesh network) via a wireless link 145. The plurality of mesh nodes 120 may operate in accordance with one or more of several wireless communication protocols to communicate with each other and/or the communication network 140. In particular, these wireless communication protocols may be based on analog, digital, and/or dual-mode communication system standards such as the Global System for Mobile Communications (GSM) standard, the Frequency Division Multiple Access (FDMA) standard, the Time Division Multiple Access (TDMA) standard, the Code Division Multiple Access (CDMA) standard, the Wideband CDMA (WCDMA) standard, the General Packet Radio Services (GPRS) standard, the Enhanced Data GSM Environment (EDGE) standard, the Universal Mobile Telecommunications System (UMTS) standard, variations and evolutions of these standards, and/or other suitable wireless communication standards.

The plurality of mesh nodes 120 may use a variety of modulation techniques such as spread spectrum modulation (e.g., direct sequence code division multiple access (DS-CDMA) and/or frequency hopping code division multiple access (FH-CDMA)), time-division multiplexing (TDM) modulation, frequency-division multiplexing (FDM) modulation, orthogonal frequency-division multiplexing (OFDM) modulation, multi-carrier modulation (MDM), and/or other suitable modulation techniques to communicate with each other. In particular, the plurality of mesh nodes 120 may use OFDM modulation as described in the 802.xx family of standards developed by the Institute of Electrical and Electronic Engineers (IEEE) and/or variations and evolutions of these standards (e.g., 802.11x, 802.15, 802.16x, etc.) to communicate via the wireless communication links with each other. The plurality of mesh nodes 120 may also operate in accordance with other suitable wireless communication protocols that require very low power such as Bluetooth, Ultra Wideband (UWB), and/or radio frequency identification (RFID) to communicate with each other.

The plurality of mesh nodes 120 may also communicate with other components associated with the wireless mesh network 110. In one example, the plurality of mesh nodes 120 may communicate with WLAN and/or WWAN devices (not shown) including network interface devices and peripherals (e.g., network interface cards (NICs)), access points (APs), gateways, bridges, hubs, etc. to implement a cellular telephone system, a satellite system, a personal communication system (PCS), a two-way radio system, a one-way pager system, a two-way pager system, a personal computer (PC) system, a personal data assistant (PDA) system, a personal computing accessory (PCA) system, and/or any other suitable communication system. The methods and apparatus described herein are not limited in this regard.

Figure 2:
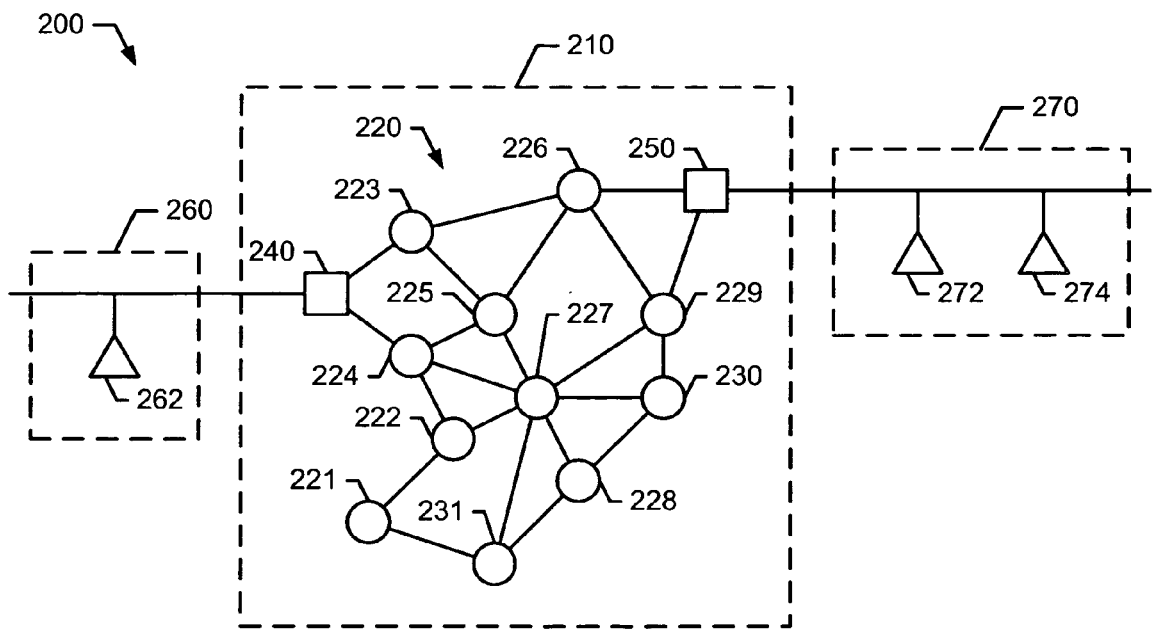
FIG. 2 depicts an example wireless mesh network of the example wireless communication system of FIG. 1.

In FIG. 2, an example wireless communication system 200 may include a wireless mesh network 210. The wireless mesh network 210 may include a plurality of mesh nodes 220. In particular, the plurality of mesh nodes 220 may include one or more non-portal nodes, generally shown as 221, 222, 223, 224, 225, 226, 227, 228, 229, 230, and 231. The wireless mesh network 210 may also include one or more portal nodes, generally shown as 240 and 250.

Each of the portal nodes 240 and 250 may operate as a transparent data-link (Layer 2) bridge to interconnect the wireless mesh network 210 to other communication networks. For example, the wireless mesh network 210 may be communicatively coupled to other communication networks, generally shown as 260 and 270, via the portal nodes 240 and 250, respectively. Each of the communication networks 260 and 270 may include one or more outside nodes, generally shown as 262, 272, and 274, relative to the wireless mesh network 210. The outside node 262 may communicate with the portal node 240 via a wired and/or wireless link. In a similar manner, the outside nodes 272 and 274 may communicate with the portal node 250 via a wired and/or wireless link. Each of the communication networks 260 and 270 may be a wireless mesh network, an Ethernet network, and/or any other suitable type of communication networks.

The destination of a packet sent or forwarded by either of the portal nodes 240 and 250 may be one of the plurality of mesh nodes 220 associated with a wireless mesh network 210. For example, the destination of a packet sent or forwarded by the portal node 240 may be a node inside the wireless mesh network 210 such as the non-portal node 227. Alternatively, the destination of a packet sent or forwarded by the portal node 240 may be a node associated with a network communicatively coupled to the wireless mesh network 210 (e.g., a node outside of the wireless mesh network 210). That is, the node outside of the wireless mesh network 210 may be accessible to the plurality of mesh nodes 220 via one or more of the portal nodes 240 and 250. In one example, the portal node 240 may access the outside nodes 272 and 274 via a route through the mesh nodes 223, 226, and 250. A node outside of the wireless mesh network 210 may also be accessible without traversing the wireless mesh network 210. For example, the portal node 240 may access the outside node 262 without traversing any of the plurality of mesh nodes 220.

The destination of a packet sent or forwarded by any of the non-portal nodes of the plurality of mesh nodes 220 may also be one of the plurality of mesh nodes 220. For example, the destination of a packet sent or forwarded by the mesh node 231 may be a node inside the wireless mesh network 210 such as the non-portal node 227. Alternatively, the destination of a packet sent or forwarded by the mesh node 231 may be a node associated with a network communicatively coupled to the wireless mesh network 210 (e.g., a node outside of the wireless mesh network 210). That is, the node outside of the wireless mesh network 210 may be accessible to the plurality of mesh nodes 220 via one or more of the portal nodes 240 and 250. In one example, the mesh node 231 may access the outside nodes 272 and 274 via a route through the mesh nodes 227, 229, and 250.

To send or forward a packet to a destination, each of the portal nodes 240 and 250 may process the packet based on bridging and routing information of the wireless mesh network 210. Each of the portal nodes 240 and 250 may include a bridging table (e.g., one shown as 300 in FIG. 3) having bridging information to identify an outbound port through which a packet may be delivered to a destination. As described in detail in connection with the process 600 of FIG. 6, the bridging table may be populated based on communication of the plurality of mesh nodes 220 associated with the wireless mesh network 210.

Each of the plurality of mesh nodes 220 may include a routing table (e.g., one shown as 400 in FIG. 4) having routing information. The routing table may be populated by a reactive mesh routing protocol such as an ad hoc on-demand distance vector (AODV) routing protocol and/or a proactive mesh routing protocol such as a destination-sequenced distance-vector (DSDV) routing protocol. In one example, the non-portal node 231 of the wireless mesh network 210 may use a corresponding routing table that may be locally stored to identify a route to transmit a message to the non-portal node 226 of the wireless mesh network 210 (e.g., an intra-network transmission). If the non-portal node 231 fails to identify a route in the routing table, the non-portal node 231 may initiate a route request. The portal nodes 240 and 250 may also receive or overhear the route request by the non-portal node 231. Accordingly, the portal nodes 240 and 250 may add a bridging entry associated with the non-portal node 231 to their corresponding bridging tables. The non-portal node 226 may generate and transmit a route reply through the wireless mesh network 210. The routing table of the non-portal node 231 may be filled in to identify a route between the non-portal nodes 226 and 231. The portal node 250 may also receive the route reply and generate a bridging entry to its bridging table for each node along the route. In response to receipt of the route reply, the non-portal node 231 may send the packet to the non-portal node 226 via a unicast delivery mechanism.

In another example, the portal node 240 may operate as a transparent bridge for a packet sent from the outside node 262 of the communication network 260 to the non-portal node 222 of the wireless mesh network 210 (e.g., an inter-network transmission). The portal node 240 may use a corresponding routing table that may be locally stored at the portal node 240 to identify a route to forward the packet to the non-portal node 222. If the routing table of the portal node 240 fails to include a route to the non-portal node 222, the portal node 240 may initiate a route request. The portal node 250 may receive the route request from the portal node 240. Accordingly, the portal node 250 may add a bridging entry indicating that the portal node 240 is associated with the wireless mesh network 210 to a corresponding bridging table that may be locally stored at the portal node 250. In response to receipt of the route request from the portal node 240, the non-portal node 222 may generate and transmit a route reply. The portal node 240 may receive the route reply and generate a route entry to the corresponding routing table for each node along the route. As a result, the current data packet and other packets received by the portal node 240 that are destined for the non-portal node 222 may use the route indicated by the routing table of the portal node 240.

Figure 3:
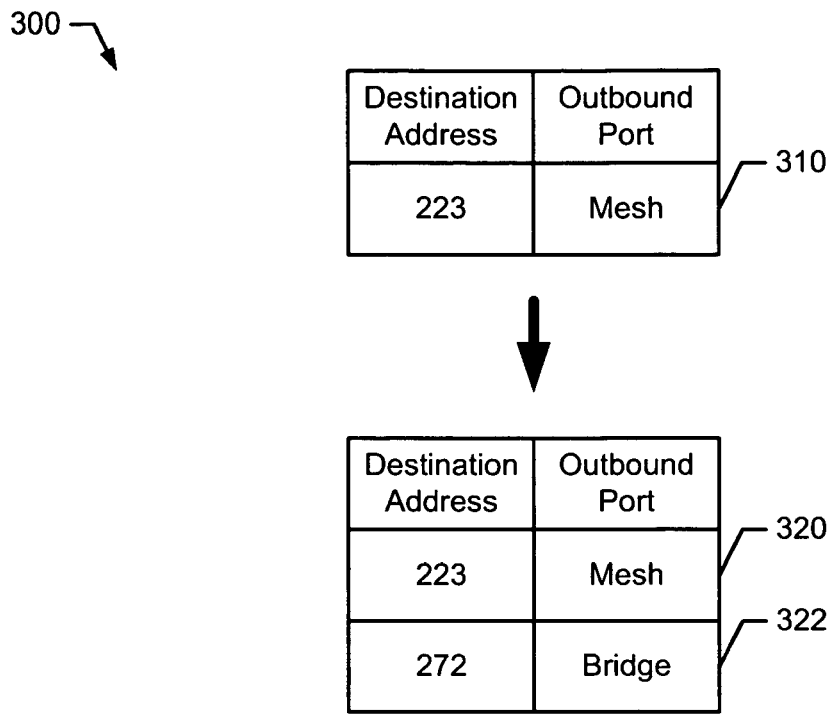
FIG. 3 depicts an example bridging table that may be used to implement the wireless mesh network of FIG. 2.
Figure 4:
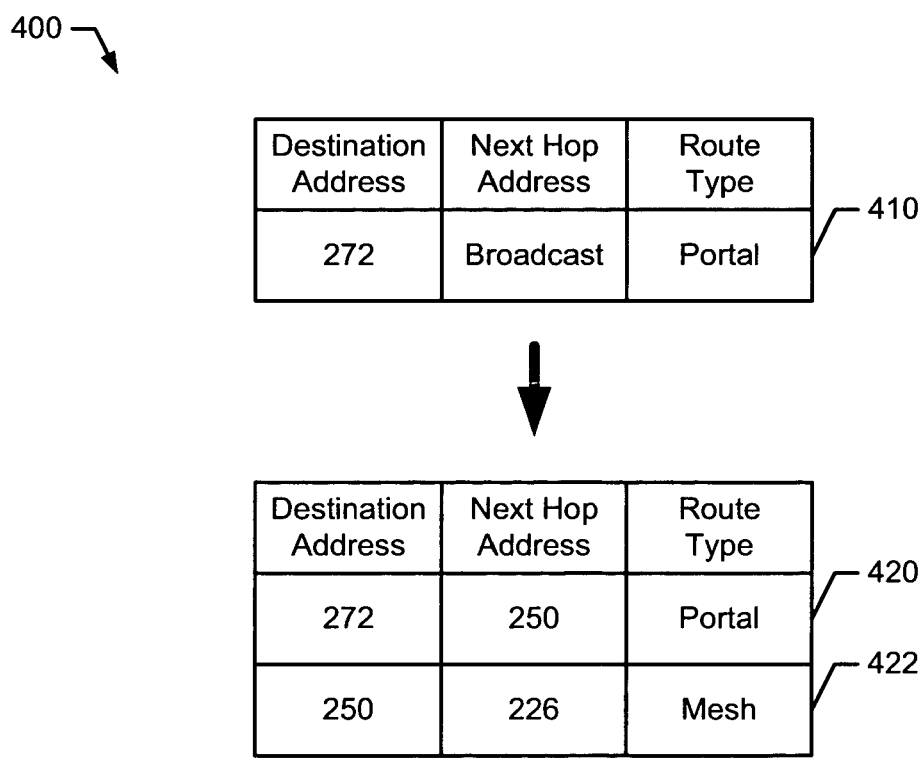
FIG. 4 depicts an example routing table that may be used to implement the wireless mesh network of FIG. 2.

In yet another example as described in connection with FIGS. 3 and 4, the non-portal node 223 of the wireless mesh network 210 may use a corresponding routing table 400 that may be locally stored at the non-portal node 223 to identify a route to transmit a packet to the outside node 272 of the communication network 270 (e.g., an inter-network transmission). If the non-portal node 223 fails to identify a routing entry associated with a route to the outside node 272 in the routing table 400, the non-portal node 223 may initiate a route request. The portal nodes 240 and 250 may receive the route request by the non-portal node 223 and add a bridging entry associated with the non-portal node 223 in their corresponding bridging tables (e.g., one shown as bridging table 300 in FIG. 3). For example, the portal node 250 may add a bridging entry 310 to the bridging table 300. The bridging table 300 may include one or more bridging entries. Each bridging entry may include a destination address and an outbound port. In particular, the bridging entry 310 may include a destination address associated with the non-portal node 223. The bridging entry 310 may also include a mesh port as an outbound port because the non-portal node 223 is inside the wireless mesh network 210.

If the route request expires prior to the non-portal node 223 receiving a route reply from the outside node 272, the non-portal node 223 may add a routing entry 410 in the corresponding routing table 400 with a broadcast address as the next hop address for the outside node 272. Accordingly, the non-portal node 223 may transmit the packet to all portal nodes of the wireless mesh network 210 with the outside node 272 as the end destination. For example, a flood delivery mechanism may be used to reach all portal nodes of the wireless mesh network 210. The portal nodes 240 and 250 may receive a flood message and forward the packet to the communication networks 260 and 270, respectively. As a result, the outside node 272 may receive the packet through the portal node 250.

At a later time, for example, the outside node 272 may send a packet back to the non-portal node 223. The portal node 250 may also receive the packet and generate another bridging entry 322 to the bridging table 300. For example, the portal node 250 may identify a bridge port as the outbound port associated with the outside node 272 because the outside node 272 is outside of the wireless mesh network 210. Accordingly, the portal node 250 may transmit an update message through the wireless mesh network 210 so that the plurality of mesh nodes 220 may learn that the portal node 250 is the proper portal node to access the outside node 272 of the communication network 270. Each of the plurality of mesh nodes 220 may add a routing entry associated with the outside node 272 to its corresponding routing table. For example, the non-portal node 223 may update the routing table 400 with a routing entry 420. In particular, the routing entry 420 may include the address of the portal node 250 as the next hop address to reach the end destination of the outside node 272. Further, the non-portal node 223 may add a routing entry 422 associated with the portal node 250. The routing entry 422 may include a node address of the non-portal node 226 as the next hop address and a mesh route as the routing type because the non-portal node 223 may reach the portal node 250 via the non-portal node 226.

Based on the routing table 400, the non-portal node 223 may identify the portal node 250 when the non-portal node 223 looks for a route to reach the outside node 272. Accordingly, the non-portal node 223 may generate and transmit a route request to the portal node 250 to establish a route to the outside node 272. Each mesh node along a route between the non-portal node 223 and the portal node 250 may know that the portal node 250 is the proper portal node to the outside node 272 and discover an optimal route to the portal node 250. As a result, each of the plurality of mesh nodes 220 may forward a packet to the outside node 272 as the end destination via a unicast delivery mechanism. The methods and apparatus described herein are not limited in this regard.

Figure 5:
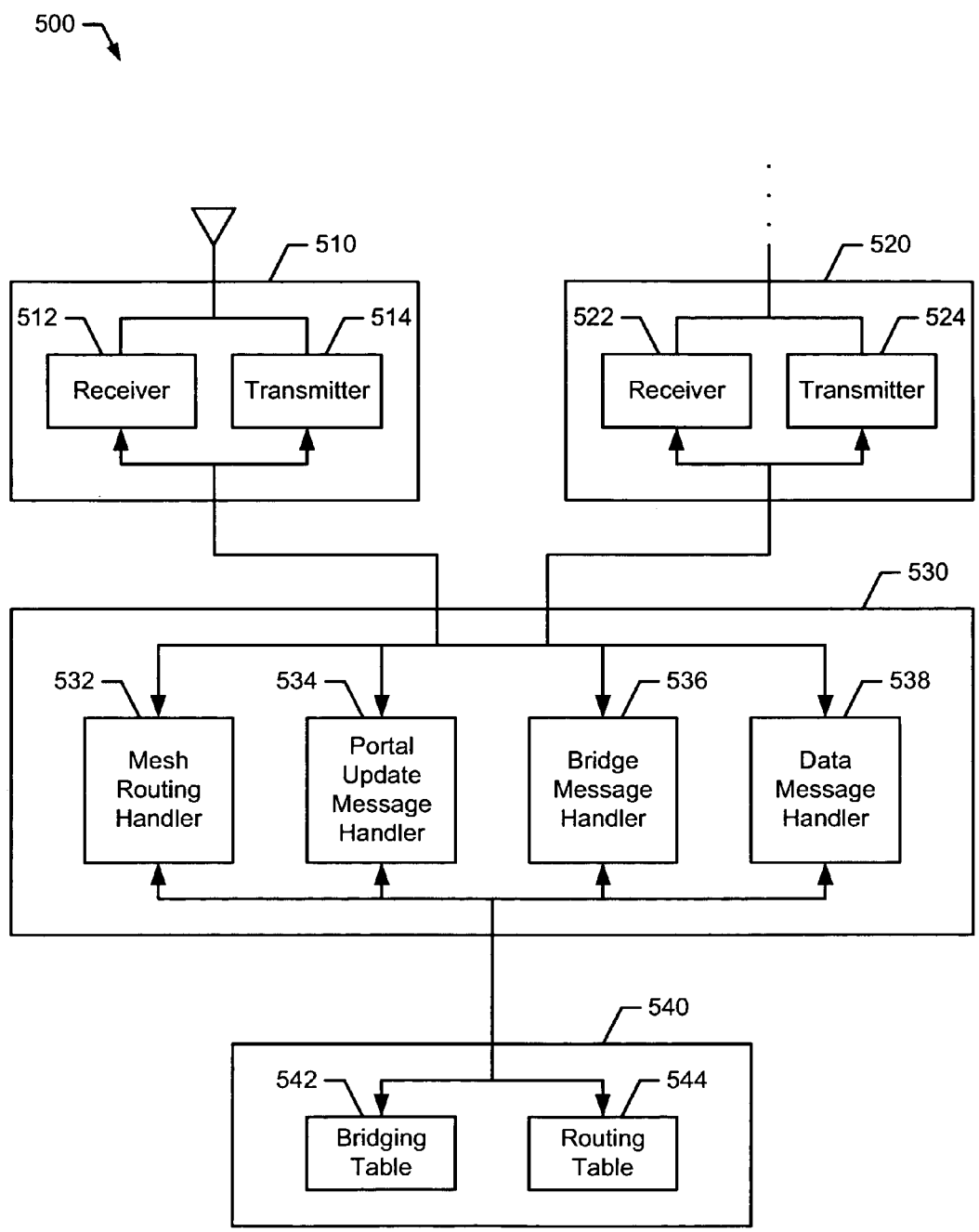
FIG. 5 is a block diagram representation of an example portal node of the example wireless mesh network of FIG. 2.

Turning to FIG. 5, for example, a portal node 500 (e.g., portal nodes 240 and 250 of FIG. 2) may include a first communication interface 510, a second communication interface 520, a controller 530, and a memory 540. Each of the first and second communication interfaces 510 and 520 may include a receiver, generally shown as 512 and 522, respectively, and a transmitter 514, generally shown as 514 and 524, respectively. The first and second communication interfaces 510 and 520 may be operatively coupled to the controller 530. The controller 530 may include a mesh routing handler 532, a portal update message handler 534, a bridge message handler 536, and a data message handler 538. The controller 530 may be operatively coupled to the memory 540. The memory 540 may include a bridging table 542 and a routing table 544.

The first communication interface 510 may be a wireless communication interface configured to receive one or more packets from other nodes via a wireless communication link. For example, the first communication interface 510 may communicate with one or more of the plurality of mesh nodes 220 of the wireless mesh network 210 (FIG. 2). The second communication interface 520 may be a wired or wireless communication interface configured to receive one or more packets from nodes in other communication networks (e.g., an Ethernet network and/or another mesh network). For example, the second communication interface 520 may communicate with the outside nodes 272 and/or 274 of the communication network 270. The first and second communication interfaces 510 and 520 may receive one or more unicast, broadcast, and/or multicast packets.

The controller 530 may be configured to process the packets received by the first and/or second communication interfaces 510 and 520. In particular, the mesh routing handler 532 may be configured to deliver a packet to a destination associated with the wireless mesh network 210. For example, the mesh routing handler 532 may operate in accordance with a mesh routing protocol such as an AODV routing protocol and/or a DSDV routing protocol to forward a packet to one of the plurality of mesh nodes 220. The portal update message handler 534 may be configured to send a portal update message to inform other mesh nodes of the wireless mesh network 210 of changes in the bridging table 542. For example, the portal update message may include information associated with location of a new node, expiration of an unused bridging entry, mobility of a node, and/or other changes in the bridging table 542. The bridge message handler 536 may be configured to update the bridging table 542 by adding, deleting, and/or modifying one or more bridging entries associated with destinations. The data message handler 538 may be configured to process the packet as described in detail below.

The bridging table 542 and the routing table 544 may be populated in response to route requests to and/or from other nodes associated with the wireless mesh network of the portal node 500. The bridging table 542 may include one or more bridging entries to keep track of one or more bridge ports through which each destination may be reached. The routing table 544 may include a routing entry for each destination known to the portal node 300. Each routing entry may include a destination address and a next-hop address. The destination address may be associated with a destination of a packet. For a mesh route, the next-hop address may be an address of the next hop along a route to the destination of the packet (e.g., the destination may be a node inside the wireless mesh network 210 or a node outside of the wireless mesh network 210).

Although FIG. 5 depicts two communication interfaces, the portal node 500 may include additional communication interfaces. Also, while the components shown in FIG. 5 are depicted as separate blocks within the portal node 500, the functions performed by some of these blocks may be integrated within a single semiconductor circuit or may be implemented using two or more separate integrated circuits. For example, although the receiver 512 and the transmitter 514 are depicted as separate blocks within the first communication interface 510, the receiver 512 may be integrated into the transmitter 514 (e.g., a transceiver). In a similar manner, the receiver 522 and the transmitter 524 may be integrated into a single component. Further, although the first communication interface 510 and the second communication interface 520 may depicted as separate blocks, the first and second communication interfaces 510 and 520 may be integrated into a single component.

FIGS. 6-11 depict one manner in which the plurality of mesh nodes 220 may be configured to provide a transparent data-link bridge associated with the wireless mesh network 210. The example processes 600, 700, 800, 900, 1000, and 1100 of FIGS. 6, 7, 8, 9, 10, and 11, respectively, may be implemented as machine-accessible instructions utilizing any of many different programming codes stored on any combination of machine-accessible media such as a volatile or nonvolatile memory or other mass storage device (e.g., a floppy disk, a CD, and a DVD). For example, the machine-accessible instructions may be embodied in a machine-accessible medium such as a programmable gate array, an application specific integrated circuit (ASIC), an erasable programmable read only memory (EPROM), a read only memory (ROM), a random access memory (RAM), a magnetic media, an optical media, and/or any other suitable type of medium.

Further, although a particular order of actions is illustrated in each of FIGS. 6, 7, 8, 9, 10, and 11, these actions can be performed in other temporal sequences. Again, the example processes 600, 700, 800, 900, 1000, and 1100 are merely provided and described in conjunction with the apparatus of FIGS. 2 and 5 as examples to configure the plurality of mesh nodes 220 to provide a transparent data-link bridge associated with the wireless mesh network 210.

Figure 6:
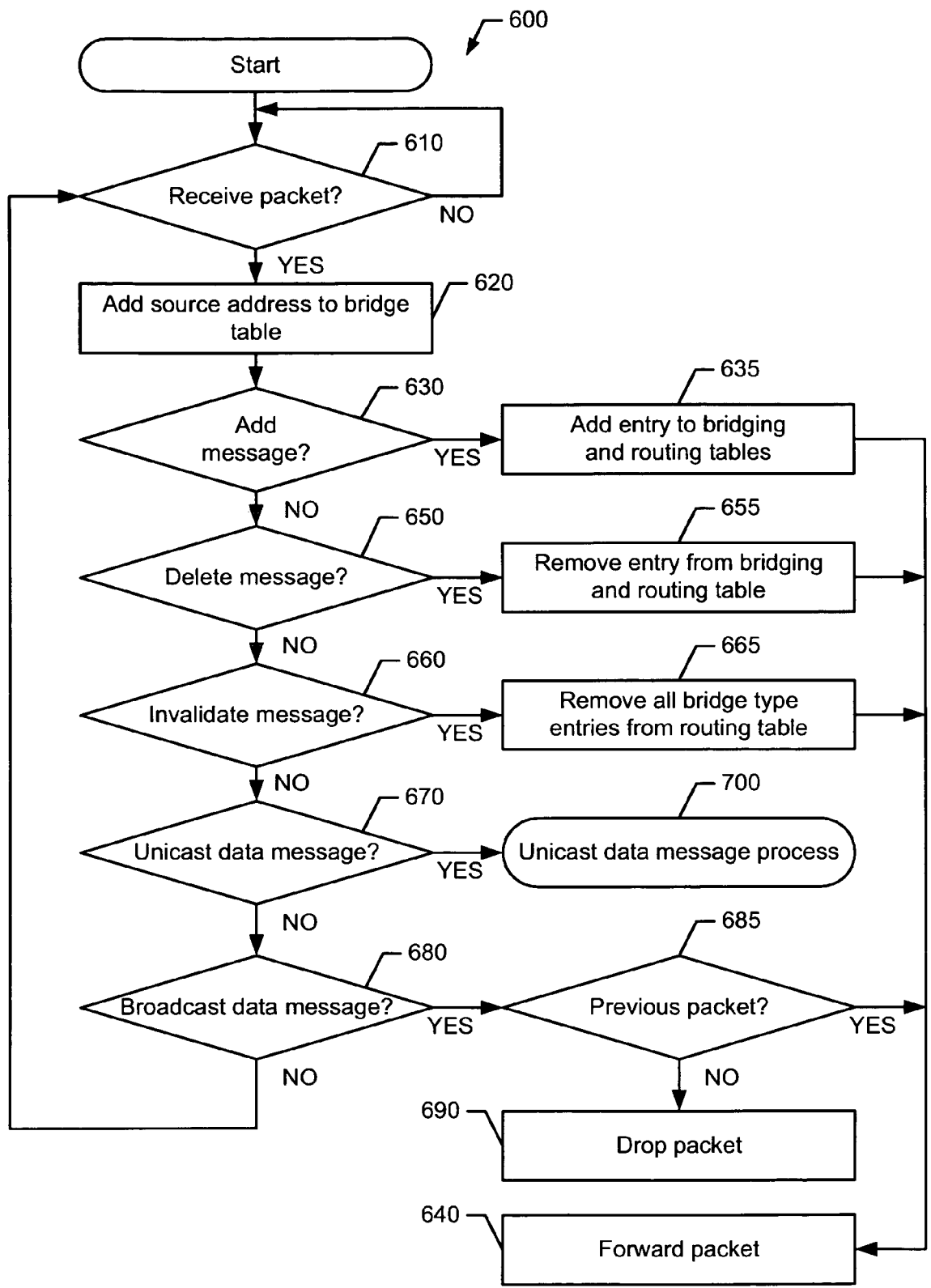
FIG. 6 depicts one manner in which the example portal node of FIG. 5 may be configured to provide a transparent bridge and to manage a bridging table.

In the example of FIG. 6, the process 600 may begin with a portal node (e.g., the portal node 500) monitoring for a packet (block 610). If the portal node 500 fails to receive a packet, the portal node 500 may continue to monitor for a packet. Otherwise if the portal node 500 receives a packet, the portal node 500 may add a source address associated with the packet to a bridge table (e.g., the bridge table 300) (block 620).

The portal node 500 may determine whether the packet includes an add message (block 630). If the packet includes an add message, the portal node 500 may add a bridging entry including bridging information to a corresponding bridging table (e.g., the bridging table 542) and a bridge type entry for a particular destination to a corresponding routing table (e.g., the routing table 544) (block 635). As noted above, each portal node may include a corresponding bridging table and a corresponding routing table that may be locally stored at the portal node. Accordingly, the portal node 500 may forward the packet to other mesh nodes associated with the wireless mesh network 210 (block 640).

Otherwise if the packet fails to include an add message, the portal node 500 may determine whether the packet includes a delete message (block 650). If the packet includes a delete message, the portal node 500 may remove a bridging entry from the bridging table 542 and a bridge type entry from the routing table 544 (block 655). The portal node 500 may forward the packet to other mesh nodes associated with the wireless mesh network 210 (block 540).

If the packet fails to include a delete message at block 550, the portal node 500 may determine whether the packet includes an invalidate message (block 560). If the packet includes an invalidate message, the portal node 500 may remove all bridge type entries from the routing table 544 (block 665). The portal node 500 may forward the packet to other mesh nodes associated with the wireless mesh network 210 (block 640).

If the packet fails to include an invalidate message at block 660, the portal node 500 may determine whether the packet includes a unicast data message (block 670). If the packet includes a unicast data message, the portal node 500 may process a unicast data packet associated with the unicast data message as described below in connection with the process 700 of FIG. 7.

Figure 7:
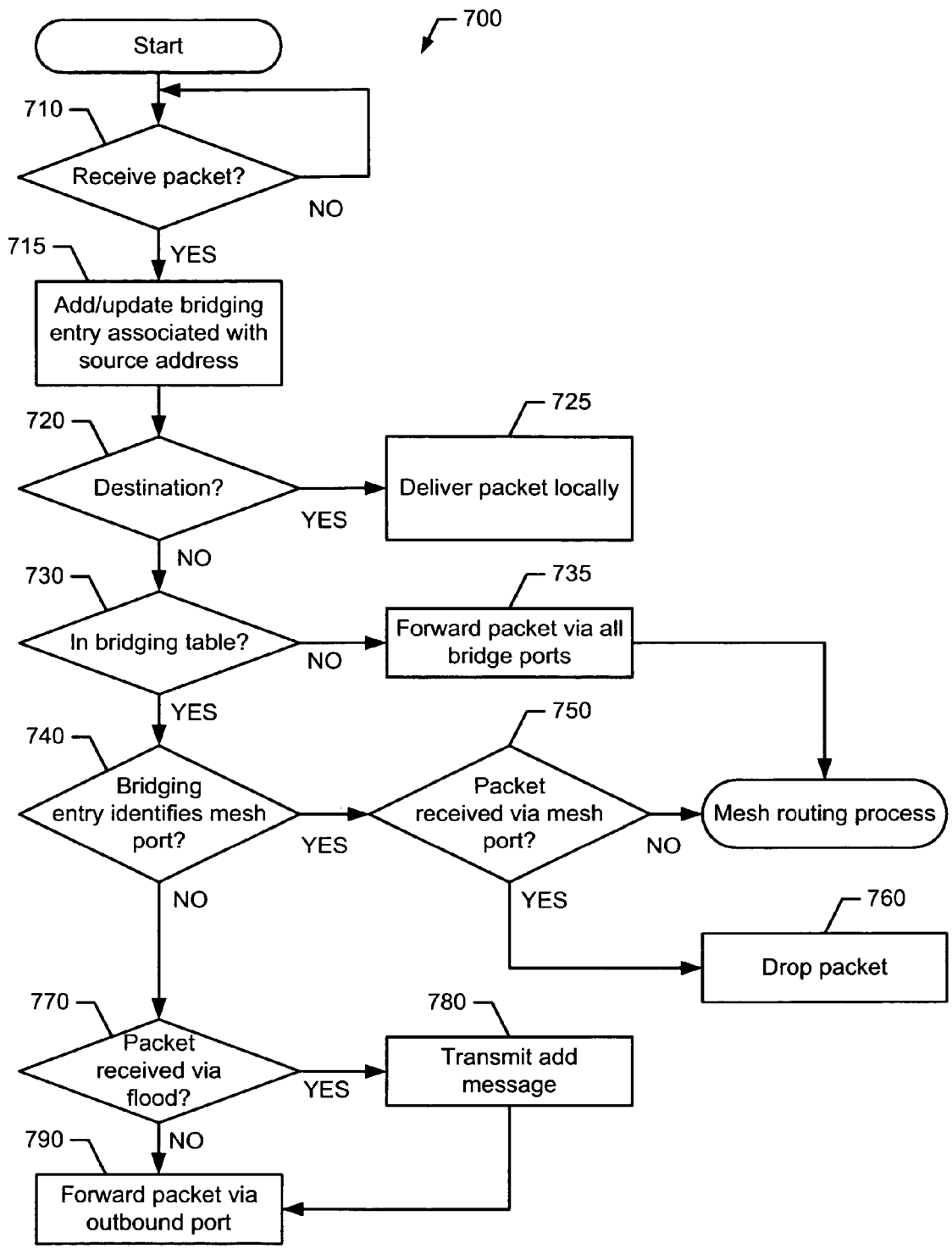
FIG. 7 depicts one manner in which the example portal node of FIG. 5 may be configured to process unicast data packets and to populate a bridging table.

In FIG. 7, the process 700 may begin with the portal node 500 (e.g., via the controller 530) monitoring for a unicast packet to populate the bridging table 542 (block 710). For example, the portal node 500 may receive a unicast packet via the first communication interface 510 and/or the second communication interface 520. If the portal node 500 fails to receive a unicast packet, the portal node 500 may continue to monitor for a unicast packet. Otherwise if the portal node 500 receives a unicast packet, the portal node 500 may add or update a bridging entry associated with a source address of the packet to the bridging table 542 (block 715).

The portal node 500 may determine whether the portal node 500 is the destination of the unicast packet (block 720). If the portal node 500 is the destination of the unicast packet, the portal node 500 may deliver the unicast packet to a local data message handler for processing (e.g., the data message handler 538) (block 725). Otherwise if the portal node 500 is not the destination of the unicast packet, the portal node 500 may determine whether the bridging table 542 includes a bridging entry associated with the destination of the unicast packet (block 730). For example, the bridging entry may include addresses of the destination and an outbound port through which the destination may be reached.

If the bridging table 542 does not include a bridging entry associated with the destination, the portal node 500 may forward the packet to all active bridge ports of the portal node 500 (block 735). Based on a spanning tree to avoid loops, the portal node 500 may forward the packet to all unblocked bridge ports. The spanning tree may be determined using, for example, IEEE standards 802.1D, 802.1W, and/or 802.1s. To forward the packet on a port associated with a wireless mesh network, the portal node 500 may implement a mesh routing process (e.g., the process 900 of FIG. 9 or the process 1100 of FIG. 11) to deliver the packet to the destination (e.g., a portal node or a non-portal node). Otherwise if the bridging table includes a bridging entry associated with the destination at block 730, the portal node 500 may determine whether the bridging entry identifies a bridge port associated with a mesh network (e.g., a mesh port) (block 740).

If the bridging entry identifies a mesh port, the portal node 500 may determine whether the portal node 500 received the packet via that particular mesh port (block 750). If the portal node 500 did not receive the packet via the mesh port, the portal node 500 may forward the packet via that particular mesh port by implementing a mesh routing process (e.g., the process 900 of FIG. 9 or the process 1100 of FIG. 11). The portal node 500 may forward the packet via the bridge port identified by the bridging entry if the portal node 500 received the packet from a bridge port other than the bridge port identified by the bridging entry in block 750. Otherwise if the portal node 500 received the packet the via the bridge port, the portal node 500 may drop the packet (block 760). That is, if the inbound port through which the portal node 500 received the packet is the same as the outbound port identified by the bridging entry of the bridging table 542, the portal node 500 may drop the packet.

Turning back to block 740, if the bridging entry identifies a non-mesh port, the portal node 500 determine whether the portal node 500 received the packet via a flood delivery mechanism to all mesh nodes associated with the wireless mesh network (block 770). If the portal node 500 did receive the packet via a flood delivery mechanism, the portal node 500 may transmit an add message to other portal nodes associated with the wireless mesh network to update one or more bridging tables corresponding to each of the other portal nodes (block 780). Accordingly, the portal node 500 may forward the packet via an outbound port as indicated by the bridging entry (block 790). For example, the bridging entry may identify an outbound port associated with a node associated with a network communicatively coupled to the wireless mesh network of the portal node 500 (e.g., outside of the wireless mesh network). Otherwise if the portal node 500 received the packet via a flood delivery mechanism at block 770, the portal node 500 may proceed directly to block 790.

Referring back to block 670 of FIG. 6, if the packet fails to include a unicast data message, the portal node 500 may determine whether the packet includes a broadcast data message (block 680). If the packet fails to include a broadcast data message, control may return to block 610 so that the portal node 500 may monitor for another packet. Otherwise if the packet includes a broadcast data message, the portal node 500 may determine whether the portal node 500 received the packet previously (block 685). If the portal node 500 received the packet previously, the portal node 500 may drop the packet (block 690). If the portal node 500 did not receive the packet previously, the portal node 500 may forward the packet to other mesh nodes of the wireless mesh network 210 (block 640) and send the packet out to all active ports. The methods and apparatus described herein are not limited in this regard.

Figure 8:
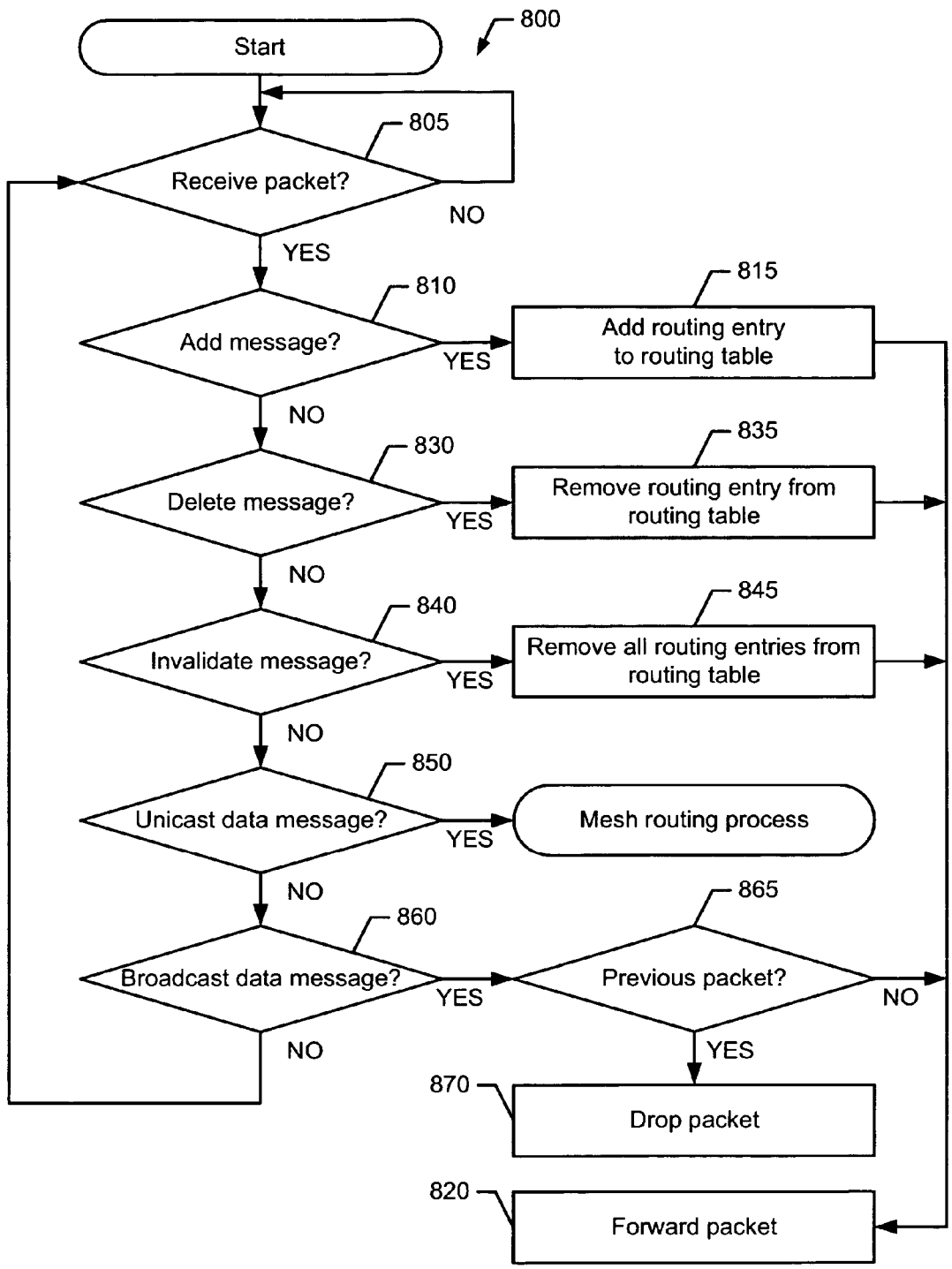
FIG. 8 depicts one manner in which a non-portal node of the wireless mesh network of FIG. 2 may be configured to communicate with a transparent bridge and to manage a routing table.

In the example of FIG. 8, the process 800 may begin with a non-portal node monitoring for a packet (block 805). If the non-portal node fails to receive a packet, the non-portal node may continue to monitor for a packet. If the non-portal node receives a packet, the non-portal node may determine whether the packet includes an add message (block 810). If the packet includes an add message, the non-portal node may add a portal-type routing entry to a corresponding routing table that may be locally stored at the non-portal node (block 815). The portal-type routing entry may include addresses of a destination node and a portal node. Accordingly, the non-portal node may forward the packet to other mesh nodes associated with the wireless mesh network 210 (block 820).

Otherwise if the packet fails to include an add message, the non-portal node may determine whether the packet includes a delete message (block 830). If the packet includes a delete message, the non-portal node may remove a portal-type routing entry from the corresponding routing table (block 835). The non-portal node may forward the packet to other mesh nodes associated with the wireless mesh network 210 (block 820).

If the packet fails to include a delete message at block 830, the non-portal node may determine whether the packet includes an invalidate message (block 840). If the packet includes an invalidate message, the non-portal node may remove all portal-type routing entries from the corresponding routing table (block 845). The non-portal node may forward the packet to other mesh nodes associated with the wireless mesh network 210 (block 820).

If the packet fails to include an invalidate message at block 840, the non-portal node may determine whether the packet includes a unicast data message (block 850). If the packet includes a unicast data message, the non-portal node may process a unicast data packet associated with the unicast data message as described below in connection with either the process 900 of FIG. 9 or the process 1100 of FIG. 11. The non-portal node may process the unicast data packet based on the type of mesh routing. For example, if the non-portal node is configured to route a packet reactively, the non-portal node may proceed to the process 900. Otherwise if the non-portal node is configured to route a packet proactively, the non-portal node may proceed to the process 1100.

If the packet fails to include a unicast data message, the non-portal node may determine whether the packet includes a broadcast data message (block 860). If the packet fails to include a broadcast data message, control may return to block 805 so that the non-portal node may monitor for another packet. Otherwise if the packet includes a broadcast data message, the non-portal node may determine whether the non-portal node received the packet previously (block 865). If the non-portal node received the packet previously, the non-portal node may drop the packet (block 870). If the non-portal node did not receive the packet previously, the non-portal node may forward the packet to other mesh nodes of the wireless mesh network 210 (block 820).

Figure 9:
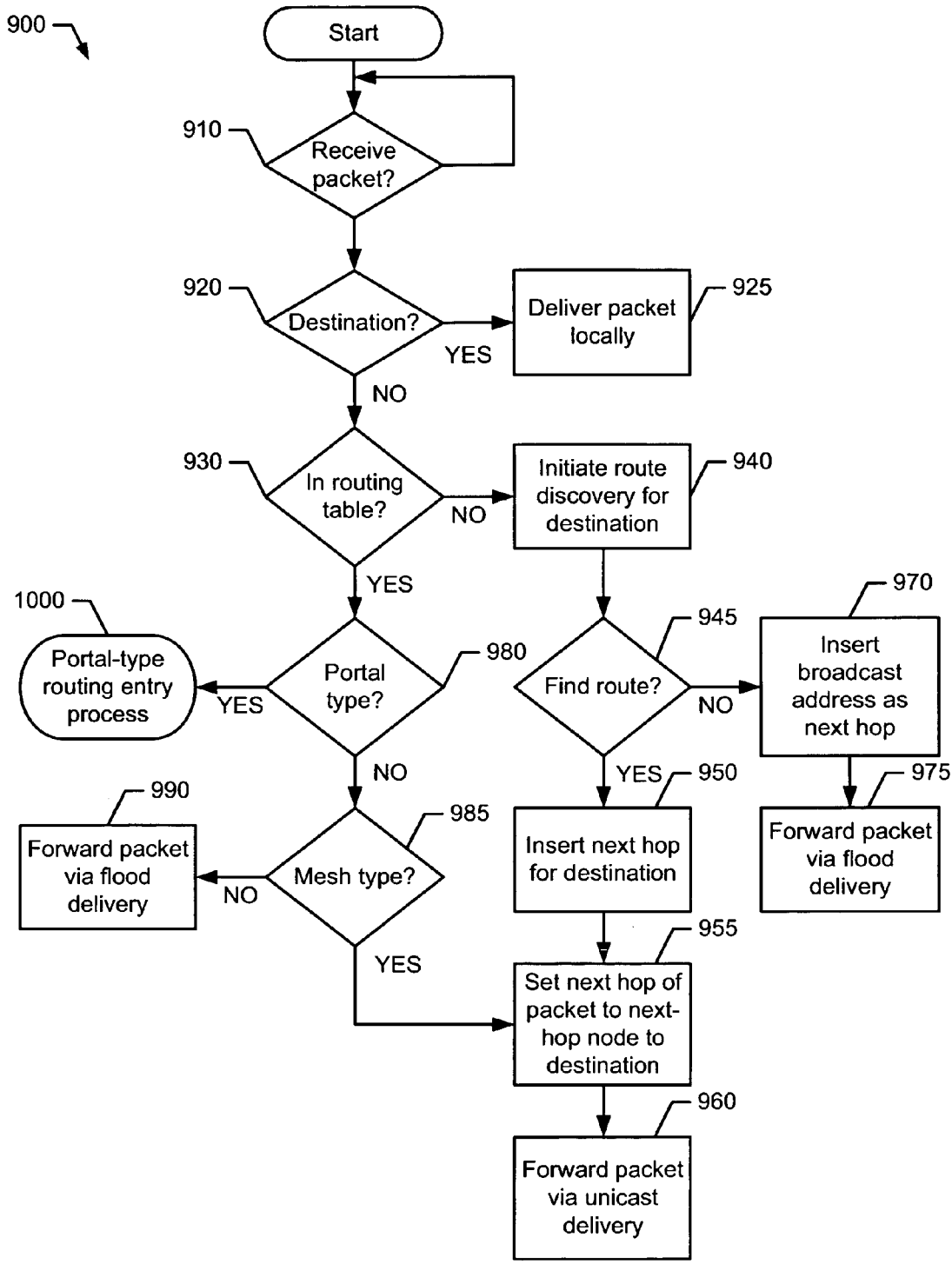
FIG. 9 depicts one manner in which a mesh node of the example wireless mesh network of FIG. 2 may be configured to process unicast messages and to populate a routing table based on a reactive mesh routing process.
Figure 11:
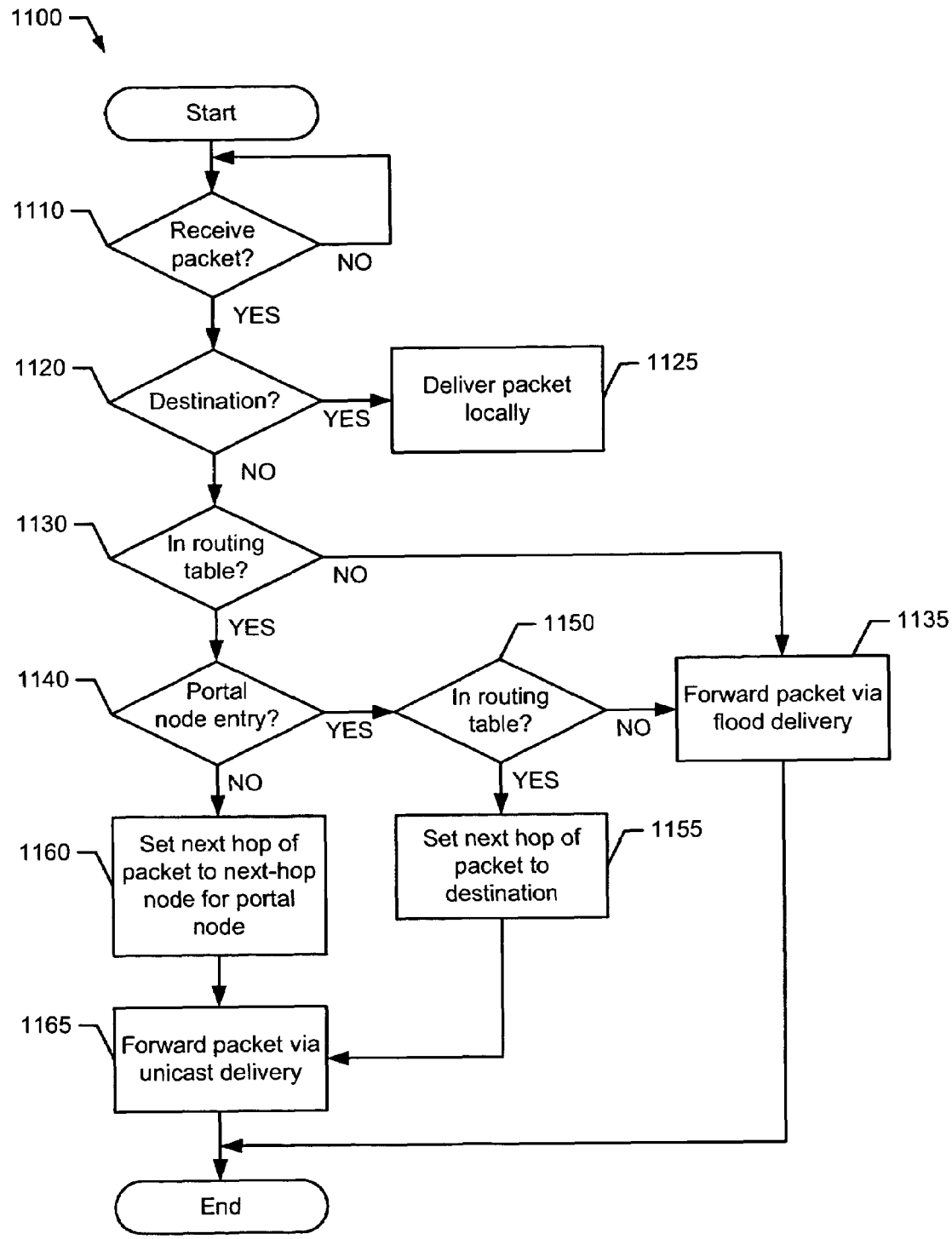
FIG. 11 depicts one manner in which a mesh node of the example wireless mesh network of FIG. 2 may be configured to process unicast messages and to populate a routing table based on a proactive mesh routing process.

As noted above, delivery of a packet associated with a wireless mesh network may use a routing table (e.g., the routing table 400 of FIG. 4) populated by a mesh routing process such as a reactive mesh routing process 900 of FIG. 9 or a proactive mesh routing process 1100 of FIG. 11. Turning to FIG. 9, for example, the reactive mesh routing process 900 may begin with one of the plurality of mesh nodes 220 associated with the wireless mesh network 210 (e.g., a portal node or a non-portal node) monitoring for a unicast packet (block 910). If the mesh node fails to receive a unicast packet, control may return to block 910 to continue monitoring for a unicast packet. Otherwise if the mesh node receives a unicast packet at block 910, the mesh node may determine whether the mesh node is the destination of the unicast packet (block 920).

If the mesh node is the destination of the unicast packet, the mesh node may deliver the unicast packet to a local data message handler for processing (e.g., the data message handler 538 of FIG. 5) (block 925). Otherwise if the mesh node is not the destination of the unicast packet, the mesh node may determine whether a corresponding routing table includes a routing entry associated with the destination (block 930).

If the routing table does not include a routing entry associated with the destination, the mesh node may initiate a route discovery to identify a route to the destination (blocks 940 and 945). If the mesh node finds a route to the destination, the mesh node may insert a routing entry with a next hop to a node address along the route to the destination in the routing table (block 950). Accordingly, the mesh node may set the next hop of the unicast packet to the destination (block 955). The mesh node may forward the unicast packet to the destination via a unicast delivery mechanism (block 960). Otherwise if the mesh node fails to discover a route to the destination at block 945, the mesh node may insert a routing entry with a next hop equal to, for example, a broadcast address in the routing table (block 970). The packet may be delivered to all portal nodes associated with the wireless mesh network using, for example, a flood delivery mechanism (block 975).

Referring back to block 930, if the routing table includes a routing entry associated with the destination, the mesh node may determine whether the routing entry is associated with a route to a portal node (e.g., a portal-type routing entry) (block 980). If the routing entry is associated with a route to a portal node, the mesh node may proceed to a portal-type routing entry process 1000.

Figure 10:
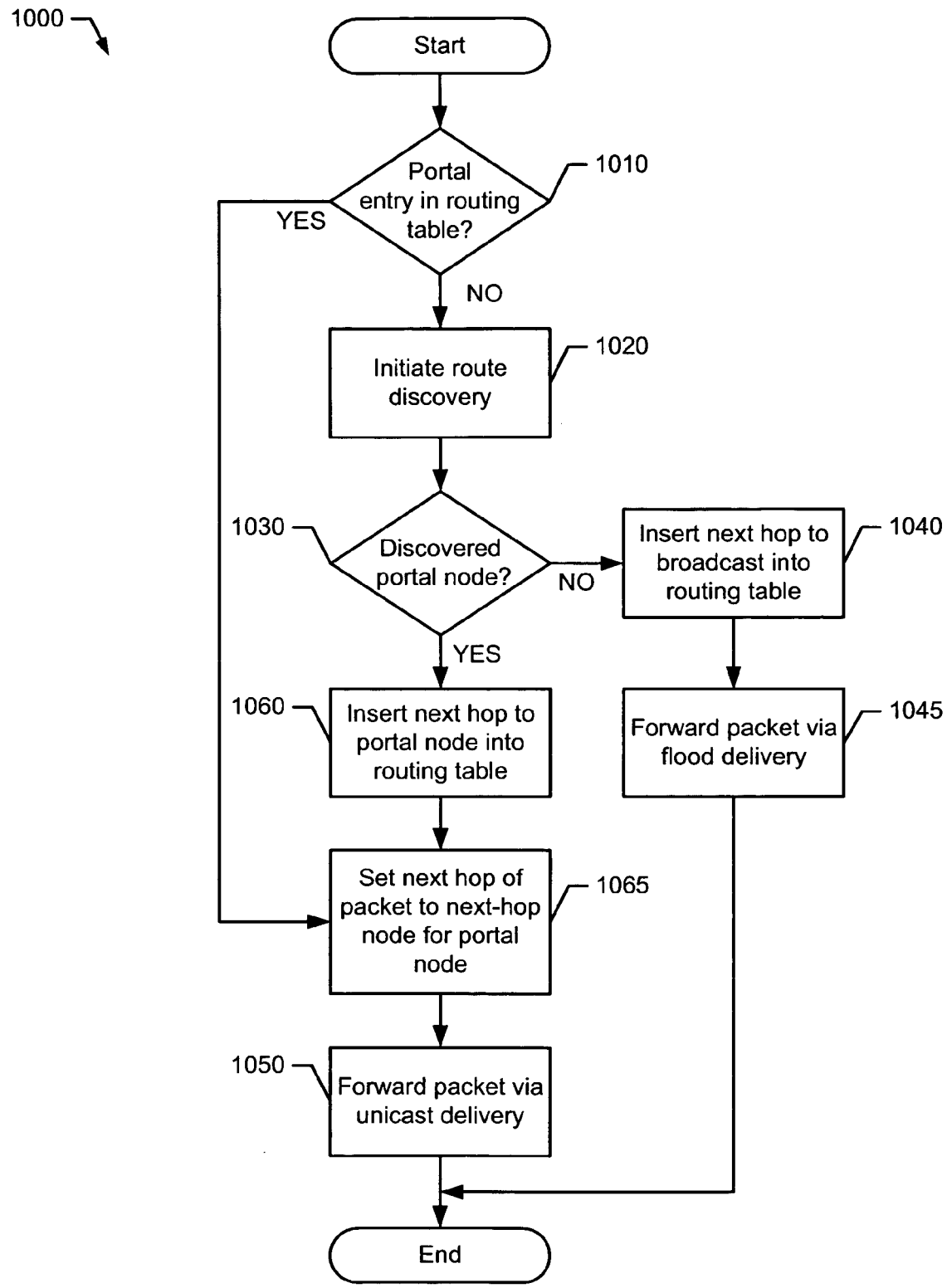
FIG. 10 depicts one manner in which a mesh node of the example wireless mesh network of FIG. 2 may be configured to process portal-type routing entries in a routing table.

Turning to FIG. 10, for example, the portal-type routing entry process 1000 may begin with the mesh node determining whether the routing table includes an entry for a portal node indicated in the portal-type routing entry that initiated the portal-type routing entry process 1000 (block 1010). If the routing table does not include an entry for the portal node, the mesh node may initiate a route discovery to identify a route to the portal node (block 1010). The mesh node may monitor for a route reply from a portal node (block 1030). If the mesh node does not find a route to the portal node, the mesh node may insert a routing entry with a next hop to, for example, a broadcast address into the routing table (block 1040). Accordingly, the mesh node may forward the unicast packet to all portal nodes of the wireless mesh network via a flood delivery mechanism (block 1045).

Otherwise if the mesh node finds a route to the portal node at block 1030, the mesh node may insert a routing entry for the portal node into the routing table (block 1060). The mesh node may set the next hop of the unicast packet to the next-hop node to the portal node (block 1065). Accordingly, the mesh node may forward the unicast packet toward the portal node via a unicast delivery mechanism (block 1050).

If the routing table includes the portal type entry at block 1010, control may proceed directly to block 1065 to set the next hop of the unicast packet to the next-hop node to the portal node. The mesh node may forward the unicast packet toward the portal node via a unicast delivery mechanism (block 1050). Accordingly, the portal-type routing entry process 1000 may terminate.

Referring back to block 980 in FIG. 9 if the routing entry is not associated with a route to a portal node, the mesh node may determine whether the routing entry is associated with a route to a mesh node (e.g., a mesh-type routing entry) (block 985). If the routing entry is associated with a route to a mesh node, the mesh node may set the next hop of the unicast packet to the next-hop node to the destination (block 955). Accordingly, the mesh node may forward the unicast packet toward the destination via a unicast delivery mechanism (block 960). Otherwise if the routing entry is not associated with a route to a mesh node at block 985, the mesh node may forward the unicast packet to all portal nodes associated with the wireless mesh network via a flood delivery mechanism (block 990).

Unicast delivery of a packet in a wireless mesh network may use a proactive mesh routing process 1100 in FIG. 11. The example process 1100 may begin with a mesh node (e.g., the portal node 500 and/or any one of the plurality of mesh nodes 220 associated with the wireless mesh network 210) monitoring for a unicast packet (block 1110). If the mesh node fails to receive a unicast packet, control may return to block 1110 to continue monitoring for a unicast packet. Otherwise if the mesh node receives a unicast packet, the mesh node may determine whether the mesh node is the destination of the unicast packet (block 1120).

If the mesh node is the destination of the unicast packet, the mesh node may deliver the unicast packet to a local data message handler for processing (block 1125). Otherwise if the mesh node is not the destination of the unicast packet, the mesh node may determine whether a locally-stored routing table includes a routing entry associated with the destination (block 1130).

If the routing table does not include a routing entry associated with the destination, the mesh node may forward the unicast packet to all portal nodes associated with the wireless mesh network via, for example, a flood delivery mechanism (block 1135). Otherwise if the routing table includes a routing entry associated with the destination, the mesh node may determine whether the routing entry is associated with a portal-type routing entry (block 1140).

If the routing entry is associated with a portal node (e.g., a portal type entry), the mesh node may determine whether the routing table includes a routing entry to the portal node (block 1150). If routing table does not include a routing entry to the portal node, the mesh node may forward the unicast packet to all portal nodes associated with the wireless mesh network via, for example, a flood delivery mechanism (block 1135). Otherwise if the routing table includes a routing entry to the portal node, the mesh node may set the next hop of the unicast packet to the next-hop node to the portal node (block 1155). The mesh node may forward the unicast packet toward the portal node via a unicast delivery mechanism (block 1165).

Turning back to block 1140, if the routing entry is not associated with a portal node (e.g., a mesh-type routing entry), the mesh node may set the next hop of the unicast packet to the next-hop node to the destination (block 1160).

Accordingly, the mesh node may forward the unicast packet toward the destination via a unicast delivery mechanism (block 1165).

While the methods and apparatus disclosed herein are described with respect to unicast and broadcast packets, the methods and apparatus disclosed herein are readily applicable other types of packets such as multicast packets. In addition, although the methods and apparatus disclosed herein are described with respect to packets, the methods and apparatus disclosed herein are readily applicable to many other types of data formats such as frames. Further, while the methods and apparatus disclosed herein are described with respect to wireless mesh networks, the methods and apparatus disclosed herein may be applied to other suitable types of wireless communication networks. For example, the methods and apparatus disclosed herein may be applied to WLANs, WPANs, WMANs, and/or WWANs.

Figure 12:
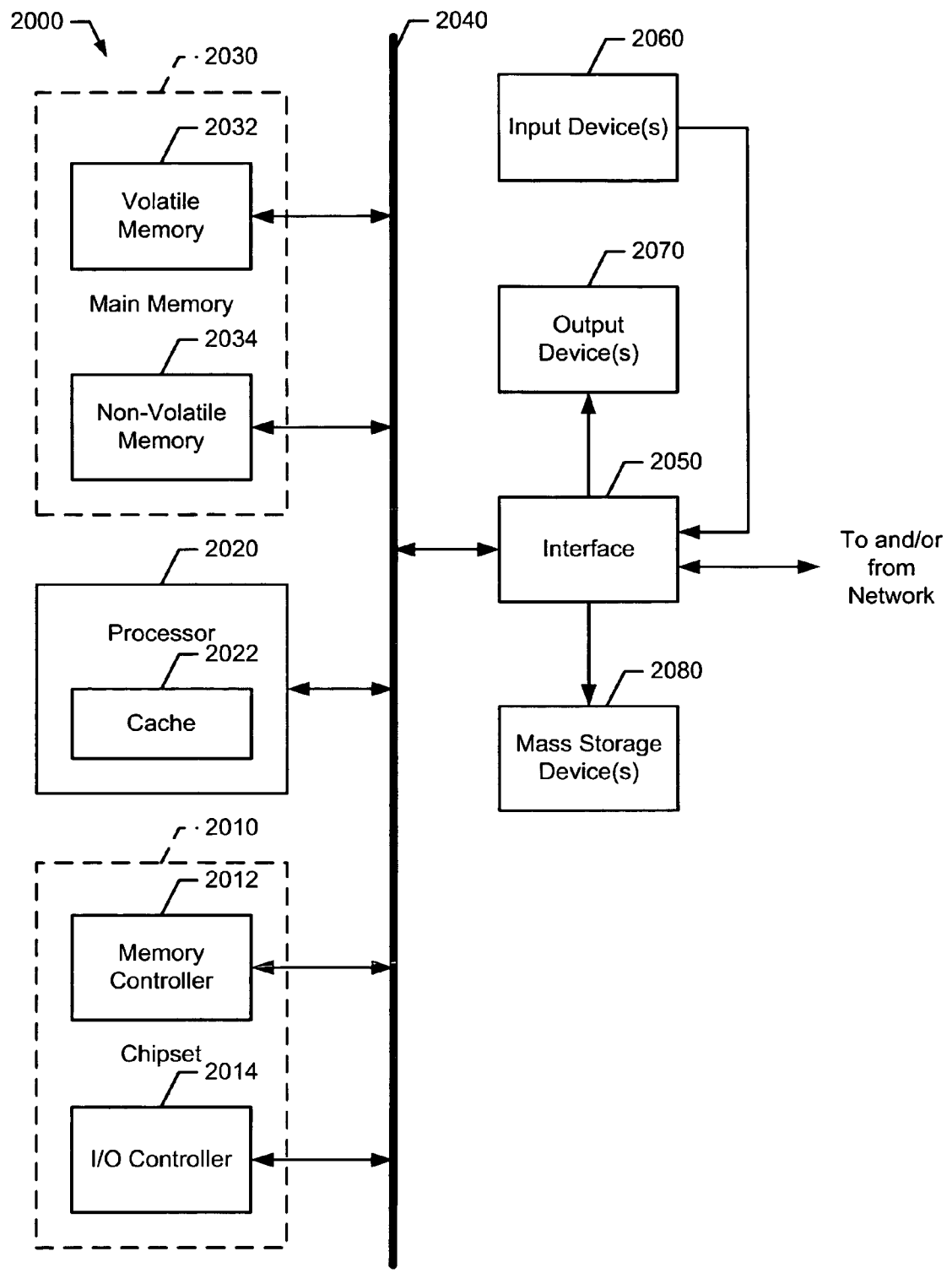
FIG. 12 is a block diagram representation of an example processor system that may be used to implement the example portal node of FIG. 5.

FIG. 12 is a block diagram of an example processor system 2000 adapted to implement the methods and apparatus disclosed herein. The processor system 2000 may be a desktop computer, a laptop computer, a handheld computer, a tablet computer, a PDA, a server, an Internet appliance, and/or any other type of computing device.

The processor system 2000 illustrated in FIG. 12 includes a chipset 2010, which includes a memory controller 2012 and an input/output (I/O) controller 2014. The chipset 2010 may provide memory and I/O management functions as well as a plurality of general purpose and/or special purpose registers, timers, etc. that are accessible or used by a processor 2020. The processor 2020 may be implemented using one or more processors, WLAN components, WMAN components, WWAN components, and/or other suitable processing components. For example, the processor 2020 may be implemented using one or more of the Intel® Pentium® technology, the Intel® Itanium® technology, the Intel® Centrino™ technology, the Intel® Xeon™ technology, and/or the Intel® XScale® technology. In the alternative, other processing technology may be used to implement the processor 2020. The processor 2020 may include a cache 2022, which may be implemented using a first-level unified cache (L1), a second-level unified cache (L2), a third-level unified cache (L3), and/or any other suitable structures to store data.

The memory controller 2012 may perform functions that enable the processor 2020 to access and communicate with a main memory 2030 including a volatile memory 2032 and a non-volatile memory 2034 via a bus 2040. The volatile memory 2032 may be implemented by Synchronous Dynamic Random Access Memory (SDRAM), Dynamic Random Access Memory (DRAM), RAMBUS Dynamic Random Access Memory (RDRAM), and/or any other type of random access memory device. The non-volatile memory 2034 may be implemented using flash memory, Read Only Memory (ROM), Electrically Erasable Programmable Read Only Memory (EEPROM), and/or any other desired type of memory device.

The processor system 2000 may also include an interface circuit 2050 that is coupled to the bus 2040. The interface circuit 2050 may be implemented using any type of interface standard such as an Ethernet interface, a universal serial bus (USB), a third generation input/output interface (3GIO) interface, and/or any other suitable type of interface.

One or more input devices 2060 may be connected to the interface circuit 2050. The input device(s) 2060 permit an individual to enter data and commands into the processor 2020. For example, the input device(s) 2060 may be implemented by a keyboard, a mouse, a touch-sensitive display, a track pad, a track ball, an isopoint, and/or a voice recognition system.

One or more output devices 2070 may also be connected to the interface circuit 2050. For example, the output device(s) 2070 may be implemented by display devices (e.g., a light emitting display (LED), a liquid crystal display (LCD), a cathode ray tube (CRT) display, a printer and/or speakers). The interface circuit 2050 may include, among other things, a graphics driver card.

The processor system 2000 may also include one or more mass storage devices 2080 to store software and data. Examples of such mass storage device(s) 2080 include floppy disks and drives, hard disk drives, compact disks and drives, and digital versatile disks (DVD) and drives.

The interface circuit 2050 may also include a communication device such as a modem or a network interface card to facilitate exchange of data with external computers via a network. The communication link between the processor system 2000 and the network may be any type of network connection such as an Ethernet connection, a digital subscriber line (DSL), a telephone line, a cellular telephone system, a coaxial cable, etc.

Access to the input device(s) 2060, the output device(s) 2070, the mass storage device(s) 2080 and/or the network may be controlled by the I/O controller 2014. In particular, the I/O controller 2014 may perform functions that enable the processor 2020 to communicate with the input device(s) 2060, the output device(s) 2070, the mass storage device(s) 2080 and/or the network via the bus 2040 and the interface circuit 2050.

While the components shown in FIG. 12 are depicted as separate blocks within the processor system 2000, the functions performed by some of these blocks may be integrated within a single semiconductor circuit or may be implemented using two or more separate integrated circuits. For example, although the memory controller 2012 and the I/O controller 2014 are depicted as separate blocks within the chipset 2010, the memory controller 2012 and the I/O controller 2014 may be integrated within a single semiconductor circuit.

Although certain example methods, apparatus, and articles of manufacture have been described herein, the scope of coverage of this disclosure is not limited thereto. On the contrary, this disclosure covers all methods, apparatus, and articles of manufacture fairly falling within the scope of the appended claims either literally or under the doctrine of equivalents. For example, although the above discloses example systems including, among other components, software or firmware executed on hardware, it should be noted that such systems are merely illustrative and should not be considered as limiting. In particular, it is contemplated that any or all of the disclosed hardware, software, and/or firmware components could be embodied exclusively in hardware, exclusively in software, exclusively in firmware or in some combination of hardware, software, and/or firmware.

What is claimed is:

1. A method comprising:

receiving, by a portal node from a source node, a broadcast data packet intended for a destination node, wherein the portal node is one of a plurality of mesh nodes associated with a wireless mesh network and communicatively coupling the wireless mesh network to a communication network different than the wireless mesh network, the source node is one of the plurality of mesh nodes of the wireless mesh network, and the destination node is one of a plurality of nodes of the communication network;

broadcasting, by the portal node, the broadcast data packet received via the wireless mesh network over the communication network to determine that the destination node is one of the plurality of nodes of the communication network;

appending, by the portal node, a bridging table with bridging information indicating that the destination node is one of the plurality of nodes of the communication network;

receiving, by the portal node, another packet including destination address information of the destination node;

identifying, by the portal node from the bridging table, bridging information associated with the destination address information; and processing, by the portal node, the other packet based on the bridging information associated with the destination address information.

2. A method as defined in claim 1, wherein identifying the bridging information associated with the destination address information of the other packet comprises identifying bridging information indicative of a failure to access the destination through the portal node.

3. A method as defined in claim 1, wherein identifying the bridging information associated with the destination address information of the other packet comprises identifying bridging information associated with a destination of one or more of a unicast data packet, a broadcast data packet, or a multicast data packet.

4. A method as defined in claim 1, wherein processing the other packet based on the bridging information comprises identifying routing information from a routing table and forwarding the other packet to a node associated with the destination information via unicast delivery.

5. A method as defined in claim 1, wherein processing the other packet based on the bridging information comprises forwarding the other packet to a node associated with the destination information via an outbound port indicated by the bridging information, and wherein the destination information refers to a node in the communication network.

6. A method as defined in claim 1, wherein processing the other packet based on the bridging information comprises dropping the other packet based on a determination that the other packet is destined for a node in a same network from which the packet originated.

7. A method as defined in claim 1 further comprising:
transmitting, by the portal node, the bridging information to the plurality of mesh nodes of the wireless mesh network to enable the plurality of mesh nodes to maintain a routing table of routing table information.

8. A method as defined in claim 1 further comprising:
transmitting, by the portal node, the bridging information to the plurality of mesh nodes of the wireless mesh network to enable the plurality of mesh nodes to identify the portal node as the portal node communicatively coupled to the communication network.

9. An article of manufacture comprising:
a computer readable medium;
content stored on the computer readable medium, wherein the content, when accessed, is configured to program a computer to:
receive a broadcast data packet intended for a destination node, wherein the computer is one of a plurality of mesh nodes associated with a wireless mesh network and communicatively coupling the wireless mesh network to a communication network, the source node is one of the plurality of mesh nodes of the wireless mesh network, and the destination node is one of a plurality of nodes of the communication network;

broadcast the broadcast data packet received via the wireless mesh network over the communication network to determine that the destination node is one of the plurality of nodes of the communication network;

append a bridging table with bridging information indicating that the destination is node is one of the plurality of nodes of the communication network;

receive another packet including destination address information of the destination node;

identify bridging information associated with the destination address information from the bridging table; and process the other packet based on the bridging information.

10. An article of manufacture as defined in claim 9, wherein the content, when accessed, is configured to program the computer to identify the bridging information associated with the destination address information of the other packet by identifying bridging information indicative of a failure to access the destination.

11. An article of manufacture as defined in claim 9, wherein the content, when accessed, is configured to program to the computer to process the other packet based on the bridging information by identifying routing information from a routing table and forwarding the other packet via unicast delivery.

12. An article of manufacture as defined in claim 9, wherein the content, when accessed, is configured to program the computer process the other packet based on the bridging information by forwarding the other packet via an outbound port indicated in the bridging information.

13. An article of manufacture as defined in claim 9, wherein the content, when accessed, is configured to program the computer to process the other packet based on the bridging information by dropping the other packet based on a determination that the other packet is destined for a node in the same network from which the packet originated.

14. An article of manufacture as defined in claim 9, wherein the content, when accessed, is configured to program the computer to transmit the bridging information to the plurality of mesh nodes of the wireless mesh network to enable the plurality of mesh nodes to maintain a routing table of routing information.

15. An article of manufacture as defined in claim 9, wherein the content, when accessed, is configured to program the computer to transmit the bridging information to the plurality of mesh nodes of the wireless mesh network to enable the plurality of mesh nodes to identify the machine as a portal node communicatively coupled to the communication network.

16. An apparatus comprising:
a plurality of communication interfaces configured to receive a broadcast data racket from a source node intended for a destination node and to communicatively couple a plurality of mesh nodes of wireless mesh network to a communication network, the communication network different than the wireless mesh network, wherein the source node is one of the plurality of mesh nodes of the wireless mesh network and the destination node is one of a plurality of nodes of the communication network, and wherein the plurality of communication interfaces is further configured to broadcast the broadcast data packet received via the wireless mesh network over the communication network to determine that the destination node is one of the plurality of nodes of the communication network;

an identifier to append a bridging table with bridging information indicating that the destination node is one of the plurality of nodes of the communication network and to identify, from the bridging table, bridging information associated with the destination information of another received packet; and a handler to process the other packet based on the bridging information.

17. An apparatus as defined in claim 16, wherein the identifier is configured to identify bridging information indicative of a failure to access the destination.

18. An apparatus as defined in claim 16, wherein the identifier is configured to identify routing information from a routing table based on the bridging information, and the handler is configured forward the other packet via unicast delivery to a node associated with the destination information.

19. An apparatus as defined in claim 16, wherein the handler is configured to forward the other packet to one or more nodes via an outbound port indicated by the bridging information.

20. An apparatus as defined in claim 16, wherein the handler is configured to drop the other packet based on a determination that the other packet is destined for a node in the same network from which the packet originated.

21. A system comprising:

a flash memory;

a receiver to receive a broadcast data packet intended for a destination node, the broadcast data packet received from one of a plurality of mesh nodes of a wireless mesh network;

a transmitter coupled to the receiver to broadcast the broadcast data packet received via the wireless mesh network over a communication network communicatively coupled to the wireless mesh network to determine that the destination node is one of a plurality of nodes of the communication network;

a processor coupled to the flash memory to append a bridging table stored in the memory with bridging information indicating the destination node is one of the plurality of nodes of the communication network; and wherein the receiver is further configured to receive another packet including destination information of the destination node, and the processor is further configured to identify the bridging information from the bridging table indicating the destination node is one of the plurality of nodes of the communication network and process the other packet on the bridging information.

22. A system as defined in claim 21, wherein the processor is configured to identify one of bridging information associated with one of the plurality of mesh nodes of the wireless mesh network or bridging information associated with a node of the communication network communicatively coupled to the wireless mesh network.

23. A system as defined in claim 21, wherein the processor is configured to identify bridging information indicative of a failure to access the destination through the system.

24. A system as defined in claim 21, wherein the processor is configured to identify routing information from a routing table and forward another packet to a node associated with the destination information via unicast delivery.

25. A system as defined in claim 21, wherein the processor is configured to forward another packet to one or more nodes via an outbound port indicated in the bridging information.

26. A system as defined in claim 21, wherein the processor is configured to drop another packet based on a determination that the other packet is destined for a node in the same network from which the packet originated.

* * * * *

UNITED STATES PATENT AND TRADEMARK OFFICE
CERTIFICATE OF CORRECTION

PATENT NO. : 7,626,967 B2 Page 1 of 1
APPLICATION NO. : 11/030523
DATED : December 1, 2009
INVENTOR(S) : Yarvis et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1367 days.

Signed and Sealed this

Second Day of November, 2010

David J. Kappos
*Director of the United States Patent and Trademark Office*